United States Patent [19]

Meyers et al.

[11] Patent Number: 4,706,084

[45] Date of Patent: Nov. 10, 1987

[54] CODED KEY-TYPE LOCKING SYSTEM

[76] Inventors: Pierre Meyers, Nimrodstr. 7, D-8012 Ottobrunn; Klaus Meister, Am Fischerwinkel 3, D-8022 Grünwald, both of Fed. Rep. of Germany

[21] Appl. No.: 783,485

[22] Filed: Oct. 3, 1985

[30] Foreign Application Priority Data

Oct. 9, 1984 [DE] Fed. Rep. of Germany ....... 3437030

[51] Int. Cl.[4] ............................................... H04Q 1/00

[52] U.S. Cl. ................................ 340/825.31; 70/278; 340/825.34

[58] Field of Search ........................ 340/825.3–825.35; 235/375, 380, 435, 440–448, 453; 70/278; 361/171, 172

[56] References Cited

U.S. PATENT DOCUMENTS

| | | | |
|---|---|---|---|
| 1,997,157 | 4/1935 | Tanschek | 235/441 |
| 2,473,664 | 6/1949 | Taylor | 340/825.31 X |
| 2,817,824 | 12/1957 | Albright | 340/825.31 X |
| 3,308,253 | 3/1967 | Krakinowski | 235/443 X |
| 3,403,380 | 9/1968 | Welch | 235/443 X |
| 3,686,659 | 8/1972 | Bostrom | 70/277 X |

FOREIGN PATENT DOCUMENTS

| | | | |
|---|---|---|---|
| 0044630 | 6/1981 | European Pat. Off. | |
| 2325548 | 5/1973 | Fed. Rep. of Germany | 235/442 |
| 2851396 | 4/1980 | Fed. Rep. of Germany | |
| 3231063 | 3/1984 | Fed. Rep. of Germany | |
| 3338608 | 1/1985 | Fed. Rep. of Germany | |
| 3437030 | 10/1986 | Fed. Rep. of Germany | |
| 0339074 | 12/1930 | United Kingdom | 235/442 |
| 1428734 | 3/1976 | United Kingdom | 235/441 |

*Primary Examiner*—Ulysses Weldon
*Attorney, Agent, or Firm*—Karl F. Ross; Herbert Dubno

[57] ABSTRACT

A locking system includes a key which has a carrier provided with coded information. The coded information is obtained from an insulating layer containing a plurality of windows in which conductive strips extend. Each window is traversed by at least one conductive strip which is electrically connected to the carrier and with at least another strip which is insulated therefrom. Applying onto the windows is a coating layer which selectively insulates each window by either insulating the one strip or the other strip or the entire window so that each window can be coded by either one of three information modes. Cooperating with the key is a reader which contains reading contacts, a potential supply contact and different types of code contacts arranged in an arbitrary manner and communicates with electrical circuitry to determine the correctness of the key.

8 Claims, 4 Drawing Figures

CODED KEY-TYPE LOCKING SYSTEM

FIELD OF THE INVENTION

Our present invention relates to a coded key-type locking system and, more particularly, to a key or key card system which has a key card provided with a code and cooperating with a reader and appropriate electronics to read the coded information.

BACKGROUND OF THE INVENTION

From the German patents DE No. 32 31 063 Cl and No. 33 38 608, keys are known which include a carrier which is of electroconductive material or is provided with a conductive coating on which an insulating layer is applied.

The insulating layer is formed with a matrix-like pattern of blank spaces which are closed by a printed insulating material or are kept open by omitting the insulating print. Thus, the blank spaces provide binary information which either permit flow of an electric current to the carrier or block flow.

By inserting the key provided with such coded blank spaces, the information is read in a galvanic manner by means of reading contacts arranged parallel to each other in a single row in the reader.

In order to optically mask the coding for an outside viewer, the blank spaces of the insulating layer after being coded in the described manner are filled with a further conductive layer.

Such a coded locking system has the disadvantage that with simple means—e.g. an ohmeter—the optically masked coded information of the key can easily be measured and can thus be transmitted to another key card so as to copy the key.

The transmission of the code to another key can be obtained by simply changing the codes within the blank spaces of the insulating layer until complete correspondence with the key which is to be copied is achieved.

In case a code element is electrically connected with the carrier but should be insulated, the insulation can be obtained by applying an insulating lacquer with a brush on this code element. If the code element is insulated towards the carrier but should be conductive, it is sufficient to scratch the layer until reaching the carrier and then to provide a connection to the surface of the code element by means of a conductive lacquer e.g. conductive lacquer of silver.

Such a key can thus easily be copied so that its use in a security system is rather limited.

OBJECTS OF THE INVENTION

It is thus the principal object of our invention to provide an improved coded key-type locking system obviating the afore-stated drawbacks.

Another object is to provide an improved system for the purposes described whereby anticopying security is greatly enhanced.

SUMMARY OF THE INVENTION

We realize this object, according to the invention, by providing a key having a conductive carrier or substrate covered by a base insulating layer onto which are applied at least one first conductive strip connected to the carrier and at least one second conductive strip insulated from the carrier. Onto these strips an insulating layer is applied which includes a plurality of blank spaces each traversed by at least one first conductive strip connected to the carrier and by another a second conductive strip insulated from the carrier. Applied onto the blank spaces is a coating layer which selectively insulates each blank space by either insulating the first conductive strip or the second conductive strip or the entire blank space so that each blank space can be coded by either one of three information modes. The substrate can be a conductive support or a synthetic region or insulating support provided with a conductive layer.

Cooperating with the key is a reader which is provided with at least one contact to read the coded information contained in each blank space and transmitting it to electronic means which compare the read information with stored information. The reader further includes a first type of code contacts which can be arranged in an arbitrary manner and quantity and are electrically connected to the potential supply so that a potential can be supplied to those blank spaces which are connected to the first type of code contacts during insertion of the key.

Through the provision of such a locking system, the copying of a key is considerably complicated as it is not sufficient to simply create a connection of each blank space or code element to the carrier or to prevent a subsequent insulation. Rather, it is necessary to precisely copy the code defined by the strips which would be possible only through electroconductive connection by means of very thin layers. This, however, requires the use of special and precise machines and in addition superior knowhow. Moreover, any copying attempt requires accurate measuring of the key which consumes a lot of time and requires again superior knowhow. Consequently, a locking system is created which provides a considerable protection against copying of the key.

By arranging the strips in an arbitrary manner along the blank spaces of the insulating layer a further coding is obtained which further complicates the evaluation of the layout and the copying of the key.

According to a further feature of the invention, the reader is provided with additional types of code contacts. Apart from the first type of code contacts which are connected to the potential supply, blind contacts which have no electric connection and code contacts which have only connection among each other are used in the reader. The coding of the reader in this manner renders a copying rather unlikely as this would require very complicated and precise measures.

In order to still further complicate copying of a key, the latter as well as the electronics is equipped with further code elements which include resistors interposed within the path of the conductive strips and the use of comparators which are set at predetermined threshold values by additional resistors so as to transmit a signal to the electronics in dependence on the resistors in the path of the strips and the set threshold values.

Through the use of threshold values as provided by the resistors further protection against copying is provided and we may note that this coding of the electronics cannot be measured from the outside of a door. It is obvious that the copying is rendered even more complicated by including in the system the setting of threshold values and additional coding of the key by means of further resistors within the path of the strips.

BRIEF DESCRIPTION OF THE DRAWING

The above and other objects, features and advantages of the present invention will become more readily apparent from the following description, reference being made to the accompanying highly diagrammatic drawing in which.

SPECIFIC DESCRIPTION

Figure 1:
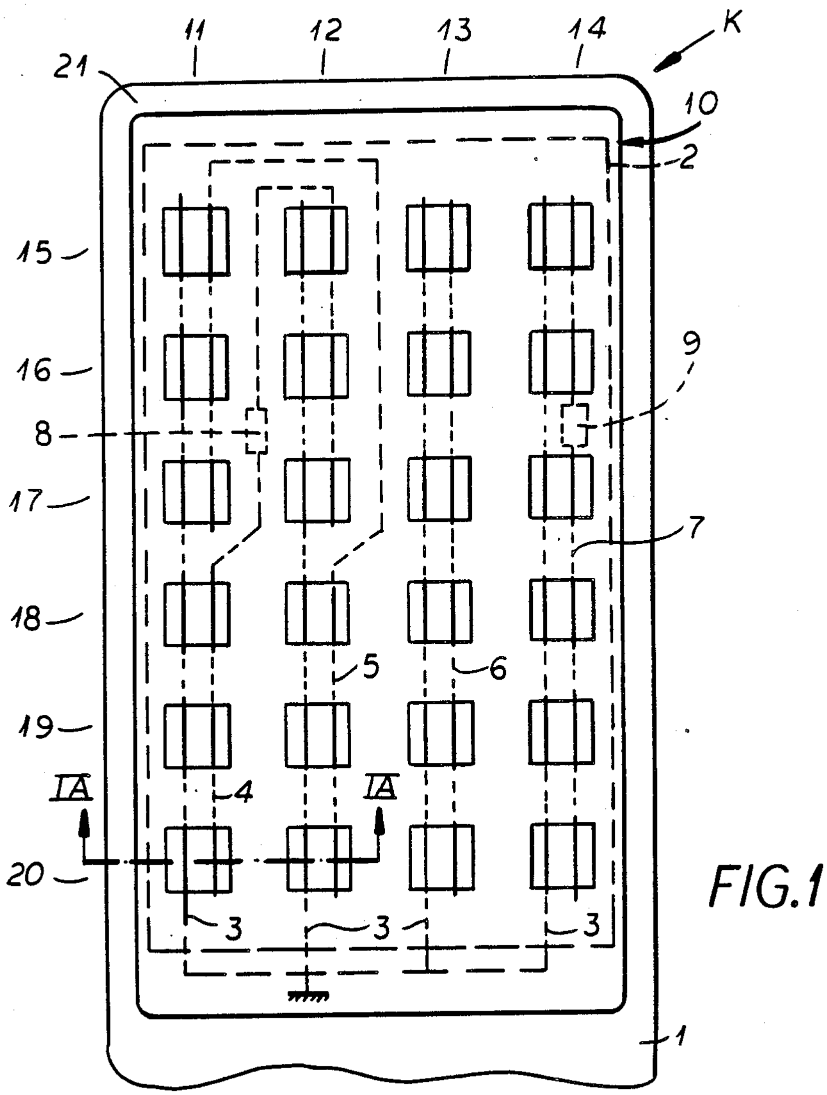
FIG. 1 is a schematic illustration of a key provided with conductive strips running through a plurality of blank spaces.
Figure 1A:
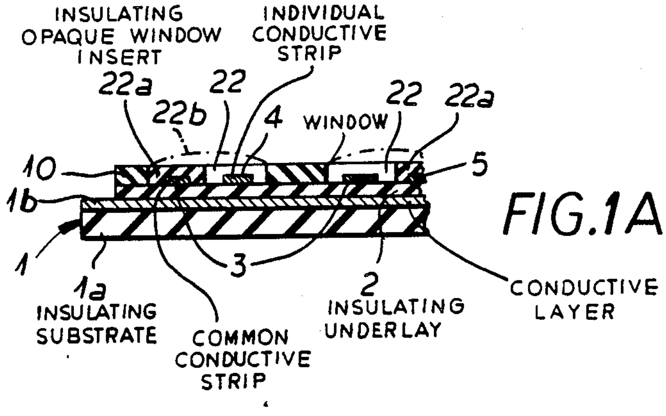
FIG. 1A is a diagrammatic section along line IA—IA of FIG. 1.

FIG. 1 shows the top portion of a key K which carries coded information and is insertable into a slot (not shown) of a reader R.

The key K includes a carrier 1 which is either made of conductive material or an insulated substrate 1A coated across its top surface with a conductive layer 1*b*. Covering the carrier 1 is a base insulating layer 2 on which electroconductive strips 3 are applied having contact with the carrier 1 or with its conductive layer 1*b* by extending over the edge of the base insulating sheath to a noncovered space of the carrier 1 or its conductive layer 1*b*. The sheath 2 is further traversed by conductive strips 4, 5, 6, 7 which have neiher contact with each other nor with the carrier 1 because they extend only on the base insulating sheath 2.

Covering the strips 3 as well as the strips 4, 5, 6, 7 is an insulating layer 10 which is provided with a matrix-shaped pattern of blank spaces 22 defined in columns and rows. In the embodiment of FIG. 1, the blank spaces 22 in the insulating layer 10 are arranged in four columns 11, 12, 13, 14 and six rows 15, 16, 17, 18, 19, 20.

Each blank space 22 which serves as a code element is traversed by one of the strips 3 and at least one of the strips 4, 5, 6, 7. As is shown in an exemplified manner in FIG. 1, one strip 3 continuously traverses each column of blank spaces 22 while the strips 4, 5, 6, 7 extend in arbitrary manner. For example, the strip 4 runs partly in column 11 and then changes to run along column 12 while strip 5 changes its way from column 12 to column 11. The strips 6 and 7 are shown to extend in a straight line and thus remain in their respective column 13 and 14.

It is obvious that a plurality of strip patterns are possible especially when allowing the strips 4, 5, 6, 7 to cross each other or the strips 3 in an insulating manner so that theoretically each blank space 22 of a key could be connected with every other blank space 22 thereof.

The connection between the blank spaces 22 with the carrier 1 or with other blank spaces 22 for coding the key K is obtained by the arrangement of the strips 3 and the strips 4, 5, 6, 7 as will be explained hereinbelow. After coding of the key K, each blank space 22 is coated by a conductive and opaque layer 22*b*, which is electrically connected to the non-insulated and conductive strips so as to provide an electric connection of the so-formed code elements to the reader R.

The blank spaces 22 or windows are coded by applying in each blank space 22 selective insulation 22*a* which selectively insulates the respective portion in a window 22 of either the strip 3 or the strip or strips 4, 5, 6, 7 (in case more than one of the strips 4, 5, 6, 7 traverses the respective blank spaces 22) or the entire blank space 22. We may note that the case in which none of the strips is insulated should be avoided as a direct connection between the strips 3 and the strips 4, 5, 6, 7 would occur which alters the desired strip pattern i.e. code.

Consequently, each blank space or code element 22 can be coded in three ways, i.e. as having a connection to the carrier 1, or a connection to one or more other code blank spaces 22 (or code elements), or by having no connection at all to either the carrier 1 or other coded blank spaces 22 by completely insulating the blank space 22.

In order to facilitate the coding of the blank spaces 22, the selective insulation 22*a* is applied at the sites of the blank spaces 22 prior to the coding with the insulating layer 10 since in this case, the selective insulation can be applied with less accuracy.

In addition to the coding of each blank space 22 in the manner described, the key K can further be coded by interposing resistors as for example resistors 8, 9 along the path of the strips 3 and strips 4, 5, 6, 7 in order to meet highest security requirements. The number, position and amount of these resistors is also arbitrary. In the example of FIG. 1, the resistor 8 is placed between the second and third rows 16, 17 inbetween the first and second columns 11, 12 while the resistor 9 is positioned between the second and third row 16, 17 in the column 14. The way in which the resistors 8, 9 codify the key K will be described in more detail hereinafter with reference to FIG. 3.

Figure 2:
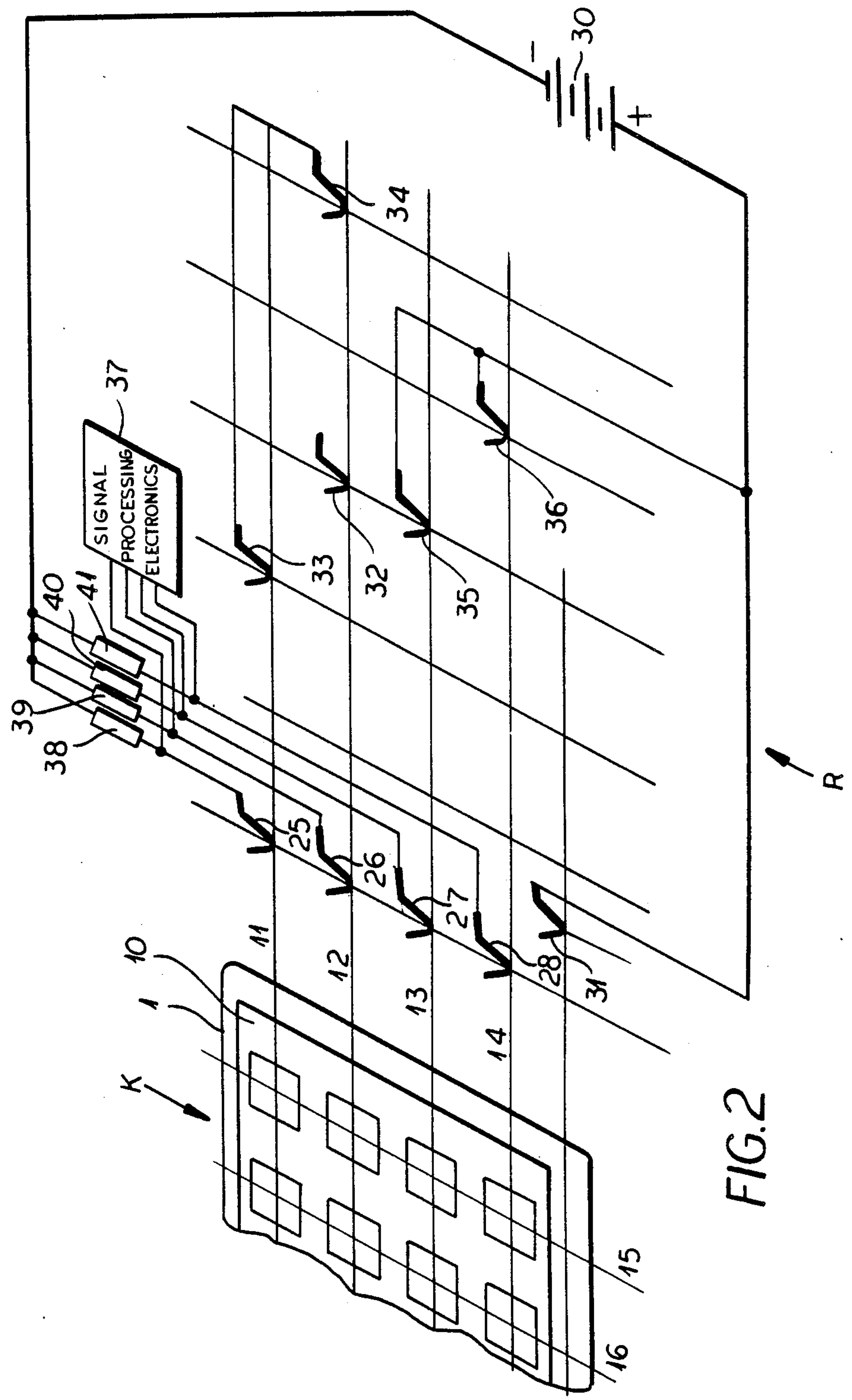
FIG. 2 is a schematic illustration of a reader provided with reading contacts and further coded information to cooperate with the keys.

FIG. 2 illustrates a reader R for converting the trivalent coded information into bivalent electrical information when the key K is inserted into the respective slot of the reader R.

In dependence on the number of columns of blank spaces 22 in the key K, the reader R is provided with a corresponding number of reading contacts. Thus, in the present case, four reading contacts 25, 26, 27, 28 are provided which are individually connected via respective resistors 38, 39, 40, 41 are connected to a signal processing respective resistors 38, 39, 40, 41 to a power supply 30 and also connected to signal processing electronics 37 in which the coded information is stored and compared with the incoming information. Upon insertion of the key K into the reader R, the reading contacts 25, 26, 27, 28 slide along the corresponding column of blank spaces, detecting whether each blank space 22 (one after the other) is either insulated or not so that depending on the coded information on the key the electric circuit is turned on or turned off enabling the electronic means 37 to determine whether or not a correct key K has been inserted into the reader R.

As shown in FIG. 2, the reader R is additionally provided with code contacts 32, 33, 34, 35, 36 which can be provided in any arbitrary manner, number or position so as to give the lock system further range to read coded information. The code contacts 32, 33, 34, 35, 36 are partly of different types which means that code contact 32 is actually a blind contact as it has no electric connection while code contacts 33, 34 are only connected to each other but not to the potential supply contact 31 to which, however code contacts 35, 36 are linked. The code contacts 35, 36 are therefore connected to the carrier 1 when the key K is inserted in the reader R. We wish to underline that FIG. 2 shows only an exemplified arrangement of such contacts and that the pattern in which these further contacts of the reader R are provided is arbitrary.

Consequently, when inserting the key K into the reader R, the electric circuit is turned on or off depending on the codes of the key K as provided by the strips 3 and 4, 5, 6, 7 and the code of the blank spaces 22 in connection with the arbitrary arrangement (coding) of the code contacts 32, 33, 34, 35, 36 of the reader R. As already mentioned, the contacts 25, 26, 27, 28 read the stored or coded key K information as the key is inserted and measure each coded blank space 22 against the potential supply contact 31 for current flow or no current flow.

As is further shown in FIG. 2, the potential supply contact 31 is backwardly offset in the direction of insertion of the key to such a degree relative to the reading contacts 25, 26, 27, 28 that the contact 31 touches the carrier 1 or its exposed marginal edge 21 during insertion of the key K only when the reading contacts 25, 26, 27, 28 have passed the marginal edge 21 and are already in contact with the insulating layer 10. Through such an arrangement of the potential supply contact 31, undesired current flow information is prevented from being transmitted to the electronics 37, i.e. any conventional decoding logic circuit which can operate a lock.

An electric connection of the contacts 25, 26, 27, 28 to the potential supply contact 31 is obtained only via such coded blank spaces 22 which have a connection to the carrier 1. Blank spaces 22 which have a connection to the carrier 1 are those in which the conductive strip 3 has not been insulated. In addition, however, also those blank spaces 22—although including an insulated strip 3—have contact with the carrier 1 which accommodate at least one of the conductive strips 4, 5, 6, 7 which is not insulated and receives the potential of the contact 31 through other code contacts 33, 34, 35, 36 via a further blank space 22.

Figure 3:
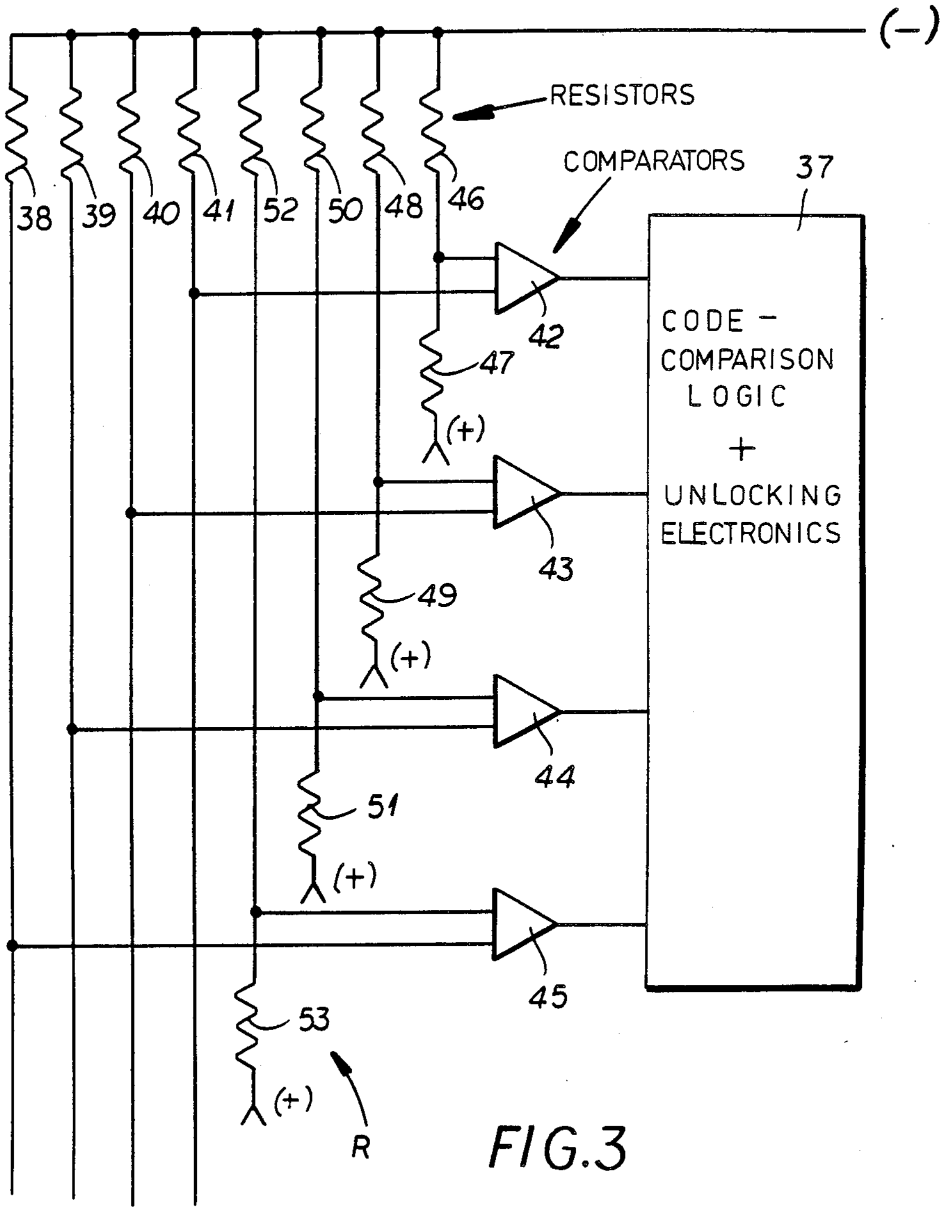
FIG. 3 is a circuit diagram of the reader provided with comparators which cooperate with resistors to transmit coded information to the electronics in dependence on predetermined threshold values.

In FIG. 2, the electronics 37 is directly connected to the resistors 38, 39, 40, 41 and is adjusted to process only bivalent signals as no resistors 8, 9 have been provided. In contrast thereto, FIG. 3 shows an embodiment in which the resistors 8, 9 are additionally used to further codify the key K. Accordingly, the electronics 37 is connected to comparators 42, 43, 44, 45 which are arbitrarily set to predetemined threshold values between the voltage 0 and the operational voltage by resistors 46-53. Whether the comparators 42, 43, 44, 45 transmit the potential 0 or 1 to the electronics 37 depends on the set threshold values by the resistors 46-53 in connection with the resistors 8, 9, of the key K together with the resistors 38, 39, 40, 41 of the reader R.

Therefore, the electric current flowing through the reading contacts 25, 26, 27, 28 from respectively coded blank spaces 22 is altered by the resistors—such as resistors 8, 9—and compared by the comparators 42, 43, 44, 45 with the set threshold values to determine whether a signal 0 or a signal 1 is to be transmitted to the electronics 37.

In the embodiment of FIG. 3, the locking system is thus provided with a key K whose blank spaces 22 are coded with trivalent information and further coded with interposed resistors 8,9 and in addition the reader R is coded with respective contacts 32-36.

We claim:

1. A locking system comprising:
a key having a conductive carrier,
an insulating base on said carrier;
at least one first conductive strip, on said insulating base,
means for connecting said first conductive strip to said carrier;
at least one further second conductive strip on said insulating base;
an insulating layer covering said first conductive strip and said second conductive strip, said insulating layer formed with a plurality of windows which are each traversed by said first conducting strip and said second conducting strip, and
a coating layer which selectively insulates each window by either insulating the first conductive strip in a first information mode or the second conductive strip in a second information mode or the entire window in a third information mode so as to code each of said windows with an information code formed from a group of at least three of said information modes;
a reader cooperating with said key and provided with:
a reading set of first contacts coming into electrical contact with said strips through said windows during insertion of said key into said reader for detecting the selective insulation of the strips of said windows,
a coding set of second contacts arranged in an arbitrary manner and quantity at least some of which are electrically connected to a potential supply, said second contacts being electrically connected to uninsulated strips of selected ones of said windows in accordance with said information code during insertion of said key in said reader, and
a potential supply contact connected to said supply and engageable with said carrier for applying an electrical potential to said carrier and to said first conductive strip enabling said reading set of first contacts to read said contained information code from said key in the form of electrical potentials detected by said reading set of first contacts; and
electronic means operatively connected to said reader and responsive to the electrical potentials detected by said reading set of first contacts for operating a lock depending upon correctness of the code represented by the arbitrary arrangement of said coding set of second contacts and the information code of the key.

2. A locking system as defined in claim 1, further comprising a conductive and opaque layer covering said windows entire areas thereof.

3. A locking system as defined in claim 1 wherein a plurality of said second conductive strips are used which are arranged in different geometrical patterns.

4. A locking system as defined in claim 1 wherein said reader includes code contacts which are arranged in an arbitrary manner and quantity and are blind contacts which have no connection to said potential supply or the code contacts which are connected to said potential supply or to each other.

5. A locking system as defined in claim 1 wherein said reader includes code contacts which are arranged in an arbitrary manner and quantity and are electrically connected with each other but not with said potential supply.

6. A locking system as defined in claim 1 wherein said key further includes electric resistors having different values of resistance and being connected with said first conductive strip and said second conductive strip in an arbitrary manner between said windows for providing said key with additional coded information.

7. A locking system as defined in claim 6, further comprising comparators connected to said electronic means and transmitting a signal thereto in dependence on said resistors and on set threshold values of said comparators.

8. A locking system as defined in claim 2 wherein said potential supply contact is backwardly offset in the direction of insertion of said key with respect to said reading set of first contacts so that upon initial insertion of said key into said reader a connection of said potential supply contact with said carrier is obtained only after said reading set of first contacts engages said insulating layer.

* * * * *